April 12, 1932.  T. N. PIERSON  1,853,221
STEERING TRUCK FOR HARVESTERS
Filed Feb. 11, 1929   2 Sheets-Sheet 1
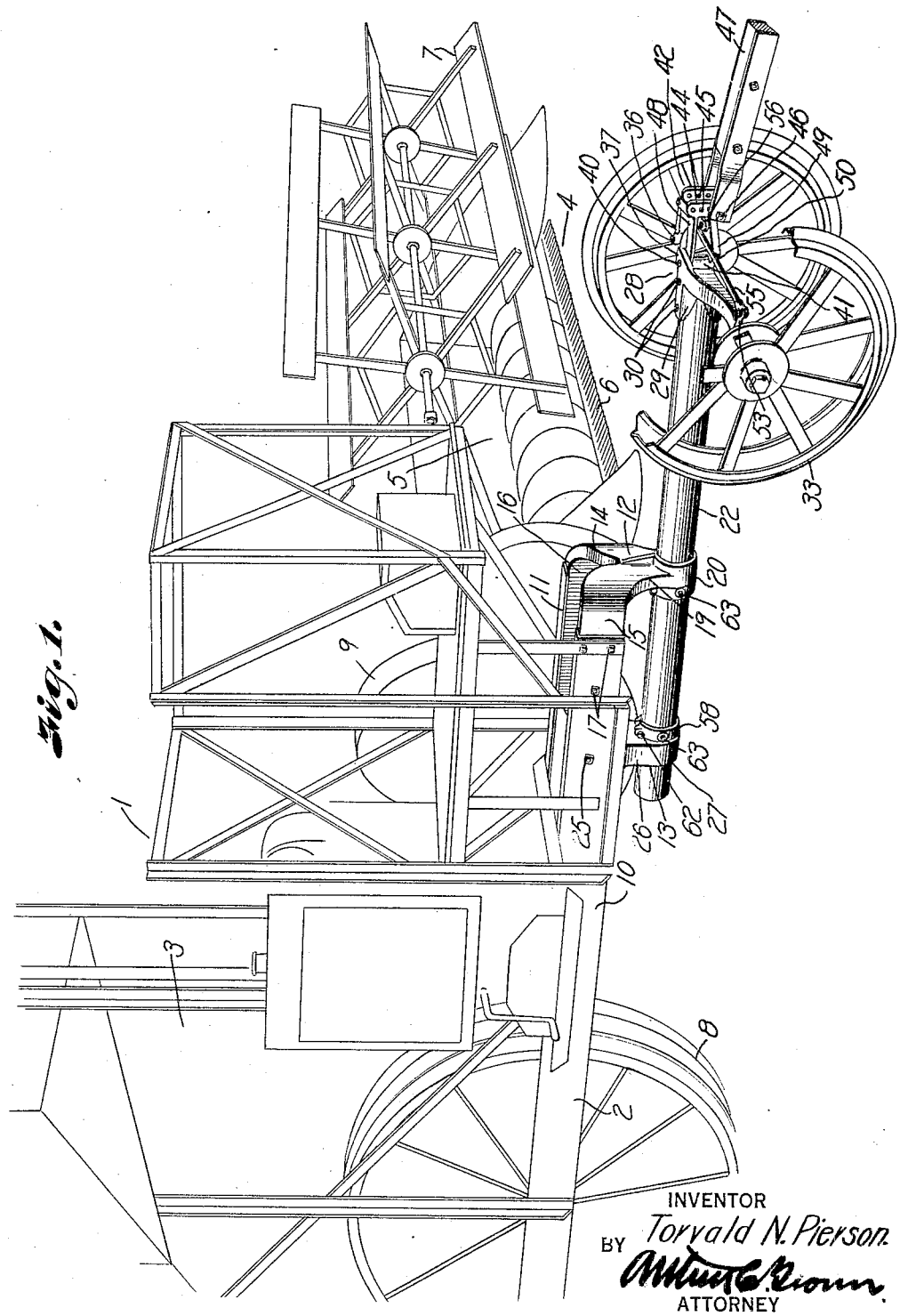
INVENTOR
Torvald N. Pierson
BY
ATTORNEY April 12, 1932.   T. N. PIERSON   1,853,221
STEERING TRUCK FOR HARVESTERS
Filed Feb. 11, 1929   2 Sheets-Sheet 2
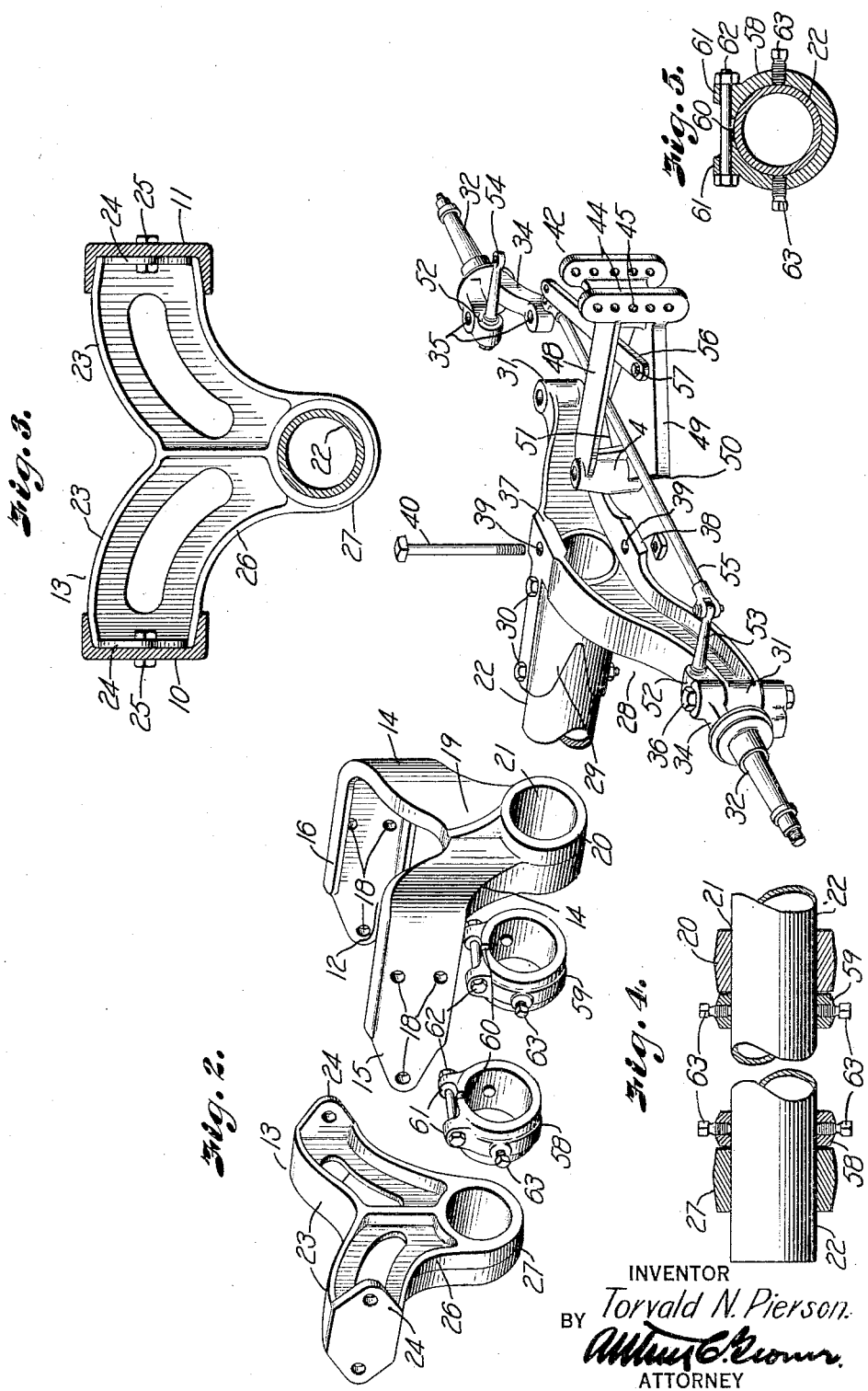
INVENTOR
Torvald N. Pierson.
BY
ATTORNEY Patented Apr. 12, 1932

1,853,221

UNITED STATES PATENT OFFICE

TORVALD N. PIERSON, OF INDEPENDENCE, MISSOURI, ASSIGNOR TO THE GLEANER COMBINE HARVESTER CORPORATION, OF INDEPENDENCE, MISSOURI, A CORPORATION OF DELAWARE

STEERING TRUCK FOR HARVESTERS

Application filed February 11, 1929. Serial No. 339,239.

My invention relates to steering trucks for heavy vehicles and more particularly for combined harvesting and threshing machines, the principal objects of the invention being to provide a device of this character which may have free differential movement relative to the rear wheels of the machine for relieving stresses and strains on the machine and to permit the sickle bar to follow the lateral contour of the ground over which the combine is moved.

Further objects of the invention are to distribute a portion of the weight of the machine on the front truck and to provide for automatic steering of the truck by the turning movement of the draft bar or tongue.

In accomplishing these and other objects of the invention, I have provided improved details of structure, the preferred forms of which are illustrated in the accompanying drawings, wherein:

Fig. 1 is a perspective view of a combine harvester provided with a front truck embodying my invention.

Fig. 2 is a detail perspective view of the truck parts shown in spaced relation.

Fig. 3 is a cross sectional view through the harvester frame, illustrating the truck trunnion supporting bracket.

Fig. 4 is a longitudinal section through the supporting brackets with the rear end of the trunnion shown in elevation.

Fig. 5 is a cross section through the truck trunnion and one of the stop collars.

Referring in detail to the drawings:

1 designates a combine harvester including a frame 2 carrying the separator mechanism 3 and a laterally projecting grain cutting mechanism 4 which comprises a grain pan 5, sickle bar 6 and reel 7 as in standard practice. The major portion of the frame 2 is supported upon a main wheel 8 adjacent the separator mechanism and upon a grain wheel 9 in line with the main wheel and at the rear of the grain pan, the forward portion of the frame being supported upon a front truck which must be positioned to permit short turns of the machine and differential leveling of the machine with relation to the main and grain wheels.

Extending from the frame forwardly of the separating mechanism and along side the end of the cutting mechanism are spaced parallel channel members 10 and 11 terminating forwardly of the machine substantially in alignment with the forward edge of the sickle bar and extending in spaced relation between the channel members are front and rear brackets 12 and 13 respectively for supporting the truck trunnion as later described.

The front bracket 12 preferably comprises a substantially V shaped casting, the branch arms 14 of which terminate in rearwardly projecting arms 15 and 16 for attachment of the bracket to the channel members by bolts 17 which extend through the vertical web of the channel and through openings 18 in the arms. The lower vertical arm 19 of the bracket is provided with a sleeve 20 preferably integral with the arm and having a bore 21 of a diameter to slidably and rotatably receive the truck trunnion 22 later described.

The rear bracket 13 is shaped similarly to the front bracket except that the branch arms 23 terminate in laterally projecting ears 24 for attaching the bracket to the channel members by bolts 25 similarly to the attachment of the front bracket. A lower arm 26 of the bracket is also provided with a bearing sleeve 27 in axial alignment with the sleeve on the forward bracket and having a bore to slidably and rotatably receive the truck trunnion.

The truck trunnion preferably comprises a pipe member of suitable diameter to provide sufficient rigidity for supporting the forward weight of the machine and is of sufficient length to position the truck forwardly of the sickle bar for providing working clearance of the draft animals or the tractor with the cutting mechanism when turning corners of the field.

Fixed to the forward end of the trunnion is the truck axle 28 preferably comprising an arch-shaped casting of "I-beam" cross-section and projecting laterally from the rear side of the axle is an integral socket member 29 for receiving the forward end of the trunnion which is fixed therein by bolts 30 projecting through the socket and trunnion as best shown in Fig. 2.

At the outer ends of the axle member are substantially vertical bearing sleeves 31 for pivotally mounting the wheel spindles 32 on which the truck wheels 33 are rotatably mounted as in standard practice, the spindles 32 preferably including yokes 34 provided with vertical bearings 35 for the spindle pins 36.

Formed in the top and bottom webs of the axle member are bosses 37 and 38 having central apertures 39 for the bolt 40 upon which the sleeve 41 of a clevis 42 is pivotally mounted, the free end of the clevis including a pair of spaced vertical wings 44 having spaced apertures 45 for a bolt 46 whereby the draft tongue 47 may be adjustably attached to the truck, and horizontal bars 48 and 49 connecting the wings 44 with the sleeve 41 and spaced to permit passage of steering gear therebetween as presently described, the lower bar 49 being preferably wider than the upper bar and provided with angularly disposed stop shoulders 50 and 51 for engaging the vertical web of the axle to limit swinging movement of the tongue.

In order to automatically steer the truck in response to swinging movement of the tongue, I provide each of the wheel spindles with an integral lug 52 for mounting steering arms 53 and 54 connected by a connecting rod 55 that extends between the plates of the clevis, the wheels being actuated by a drag link 56 which is pivotally connected with the lower plate of the clevis by a bolt 57 and with the left hand steering arm so that swinging movement of the clevis will impart swinging movement of the wheels through the drag link.

Due to the extreme width of the combine, it is necessary to provide a rotary or swivel connection between the truck and the combine frame to relieve strains on the frame caused by unevenness of the ground over which the machine may travel and to accomplish this object I provide for rotatable mounting of the trunnion member in the supporting brackets but fix it against longitudinal movement with relation to the brackets by stop collars 58 and 59, one fixed to the trunnion in the rear of the front bracket and the other in front of the rear bracket so that the pulling force applied to the tongue of the truck will be imparted to the frame because of the collar 59 and backing force applied to the tongue will be imparted to the frame through the collar 58.

The collars are split as at 60 and are provided with aligning ears 61 at the sides of the slots to receive bolts 62 to clamp the collars to the trunnion. The collars are further secured by set screws 63 which are threaded through the collars and bear against the trunnion.

In assemblying the truck with the combine, the trunnion, which is fixedly mounted on the axle, is slid through the bearing of the front bracket and the stop collars are slipped over the end of the trunnion after which the trunnion is slid through the bearing sleeve of the rear bracket a sufficient distance to properly position the truck. The collars are then tightened to retain the trunnion against longitudinal movement in the brackets and the tongue may be adjusted in the clevis for the height of the draft to complete the assembly.

What I claim and desire to secure by Letters Patent is:

1. In a harvesting machine including a frame, a main wheel supporting the frame and a grain wheel spaced from the main wheel for stabilizing the frame, spaced brackets dependingly carried by the frame in line of draft of the main wheel, bearing collars on the brackets, a trunnion rotatably mounted on the bearing collars and fixed against longitudinal movement therein, a steering truck fixed to the end of the trunnion and a tongue pivoted to the steering truck in alignment with the trunnion.

2. In a machine of the character described comprising spaced frame members, brackets on the frame members including spaced bearings, a trunnion member rotatably mounted in the bearings, rings adjustably attached to the trunnion and engageable with the bearings, an axle member, a socket member carried by the axle member and sleeved over the trunnion, means for fixing the trunnion in the socket member, wheels supporting the axle member, a tongue member pivotally mounted on the axle member in alignment with the trunnion, and means for steering the wheels incidental to pivotal movement of the tongue member.

3. In a machine of the character described comprising spaced frame members, brackets on the frame members including spaced bearings, a trunnion member rotatably mounted in the bearings, rings adjustably attached to the trunnion and engageable with the bearings, an axle member, a socket member carried by the axle member and sleeved over the trunnion, means for fixing the trunnion in the socket member, wheels supporting the axle member, a tongue member pivotally mounted on the axle member in alignment with the trunnion and having stop shoulders for engaging the axle member to limit pivotal movement of the tongue member, and means for steering the wheels incidental to pivotal movement of the tongue member.

In testimony whereof I affix my signature.

TORVALD N. PIERSON.